March 25, 1969 G. F. VOGT 3,435,454

ELECTRONIC SERVO SYSTEM

Filed Feb. 1, 1968

INVENTOR.
GOTTFRIED F. VOGT.
BY Jack H. Stanley AGENT.
Harry M. Saragovitz, Edward J. Kelly & Herbert Berl
ATTORNEYS.

United States Patent Office 3,435,454

Patented Mar. 25, 1969

3,435,454

ELECTRONIC SERVO SYSTEM

Gottfried F. Vogt, Lincroft, N.J., assignor to the United States of America as represented by the Secretary of the Army Filed Feb. 1, 1968, Ser. No. 702,422
Int. Cl. H04b 7/16
U.S. Cl. 343—100 7 Claims

ABSTRACT OF THE DISCLOSURE

An electronic servo system adapted for use in a polarization follower system. An error voltage is generated when the incident phase system angle of a target differs from the polarization angle. The error signal is applied as a control voltage to a variable oscillator whose output frequency is controlled thereby. A standard oscillator is also provided whose frequency is fixed such that at zero error signal the frequency outputs of the variable oscillator and the standard oscillator are equal. The standard crystal oscillator frequency is divided 50:1 and further divided by 2 to 1 in a manner such that there is produced two digital signals at the same frequency but differing in phase by 90°. The two digital signals are converted to two sine wave signals 90° out of phase to effectively provide a sine and cosine signal. The variable oscillator output is divided 100:1 and digitized so that this submultiple frequency differs from that derived from the standard oscillator by a relatively low frequency which is a function of the magnitude of the error signal. The submultiple sine and cosine signals are applied to respective gating circuits which are activated at prescribed times by the digitized submultiple frequency output of the variable oscillator. This signal is modulated by a reference signal which also is the reference signal to which the demodulated output of the system receiver is phase compared to produce the error signal. The instantaneous amplitude of the respective gated sine and cosine signals allowed to pass through the gating circuits are converted to respective DC voltages which are combined in a manner at the receiver of the system to decrease the error signal towards zero.

The invention described herein may be manufactured, used, and licensed by or for the Government for governmental purposes without the payment to me of any royalty thereon.

*Background of the invention*

This invention relates to tracking servo systems and more particularly to an all electronic tracking servo system adapted for use in a polarization follower system.

It has been found that conventional mechanical servo systems exhibit certain shortcomings when utilized as part of a system for tracking changing polarization patterns of electromagnetic waves. An example of such a polarization follower system is shown in the October 1964 issue of the Radio and Electronic Engineer in an article entitled "An Analogue Polarization Follower for Measuring the Faraday Rotation of Satellite Signals," pages 269–278 and in FIG. 10 of G. F. Vogt Patent No. 3,238,527. As described in Vogt Patent No. 3,238,527 and the above noted publication, in order to measure the polarization angle $\alpha$ of the incident wave, the polarization of the antenna is swept by means of an appropriate scanning frequency $F_s$ (27 c./s.) $\angle 0°$, and a D-C control voltage $V_c$ is superimposed on the scanning frequency. $V_c$ is a measure of the system phase angle $\beta$ as described in the above noted Patent No. 3,238,527 and when $\beta$ differs from $\alpha$, the incident polarization angle, a positive or negative error voltage, $\pm e$, is generated. This voltage controls the direction and speed of a mechanical servo motor which functions to keep $\beta=\alpha$ so that the control system follows any polarization change of the received signal and the servo system output voltage $V_c \approx \alpha$ can be recorded. In the servo system shown in the October 1964 publication, the mechanical shaft rotation is converted to an analogue voltage that is proportional to the rotation until 360° ($2\pi$) is reached. At this point, the voltage jumps down $2\pi$ where it starts the cycle again. The disadvantages of utilizing a mechanical servo system in the tracking system described in the above-noted October 1964 publication are that undesirable transient responses are present, the linearity is not high enough, and the dynamic range is limited.

*Summary of the invention*

It is an object of the present invention to provide an all electronic servo system wherein the above-noted limitations are overcome.

In combination with a polarization follower system which includes a pair of quadrature positioned crossed dipole antennas, means for producing signal components of the angle of polarization of an incident wave of high frequency energy, a summer for adding the signal components and a receiver for demodulating the sum signal, there is provided an electronic servo system for maintaining the system phase angle in synchronism with the incident polarization angle. The electronic servo system includes a source of reference frequency signals and means for comparing the phase of the demodulated signal with the reference frequency signal to produce an error signal representative of the phase displacement therebetween. Also included are a standard frequency signal source and means for deriving from the standard frequency signal two sine wave signals having the same frequency but differing in phase by 90°, this frequency being a prescribed submultiple of the standard frequency signal. Included further is a variable frequency signal source responsive to the error signal and adapted to produce an output frequency equal to the standard frequency signal at zero error signal, and means for deriving from the variable frequency signal a submultiple thereof substantially equal to the prescribed submultiple frequency. The difference between the two submultiple frequencies is a function of the magnitude of the error signal. In addition, there is included means responsive to the variable submultiple frequency signal and modulated by the reference signal to produce cyclic pulses, and respective gating means responsive to the sine and cosine wave signals and actuated by the cyclic pulses whereby only a prescribed magnitude of the respective sine and cosine wave signals pass through the gating means. Also included are means including the signal components producing means and responsive to the output of the gating means for reducing the phase displacement between the receiver demodulated signal and the reference signal to reduce the error between the system phase angle and the incident polarization angle.

*Brief description of the drawing*

For a better understanding of the invention, together with other and further objects thereof, reference is had to the following description taken in connection with the accompanying drawing in which.

*Description of the preferred embodiment*

Figures 1, 2:
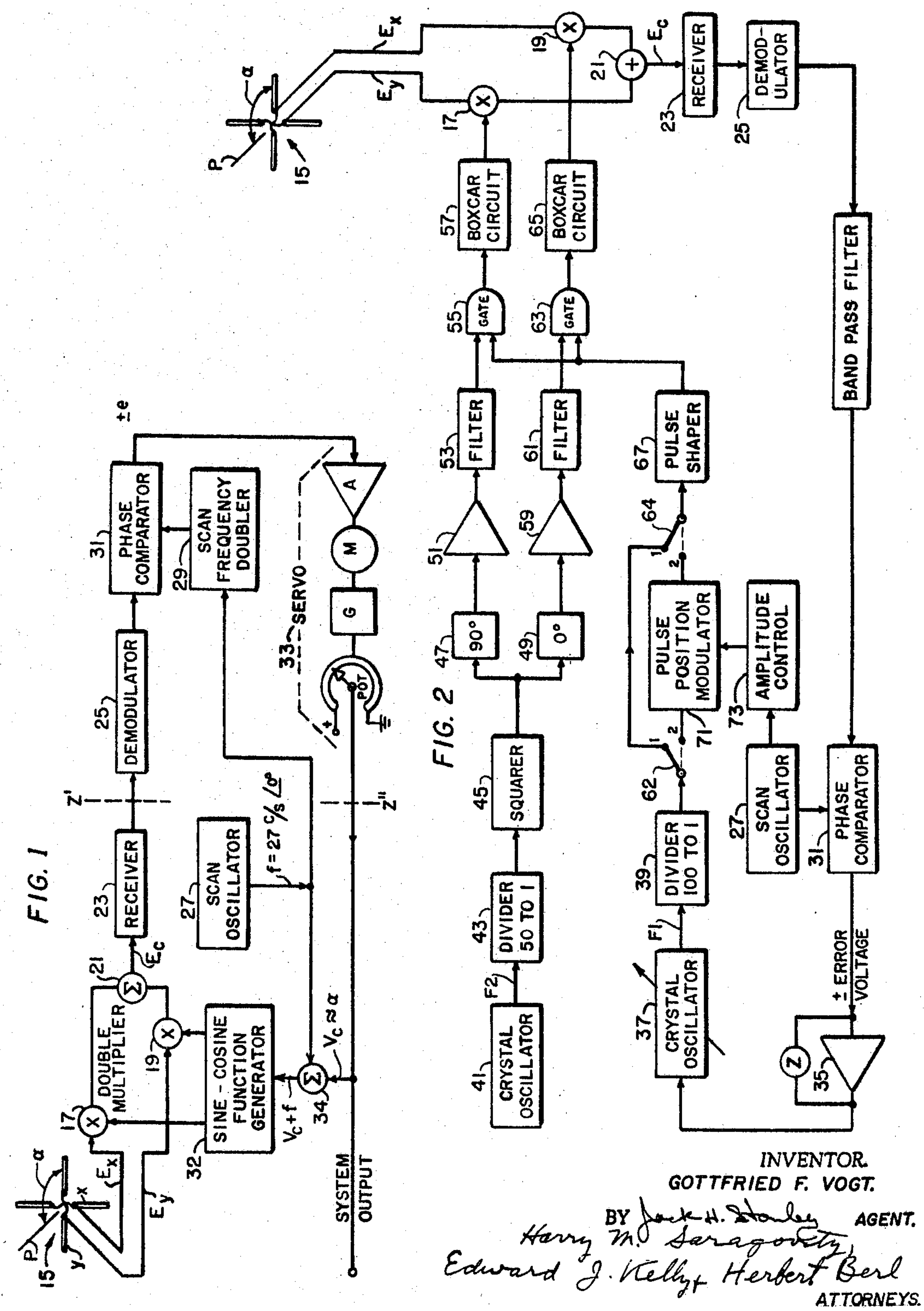
FIG. 1 is a schematic block diagram of a polarization follower system utilizing a mechanical servo system.
FIG. 2 is a schematic block diagram embodying the present invention.

To better understand the present invention it will be described in conjunction with a polarization follower system shown in FIG. 1 wherein a conventional mechanical servo system connected between points Z′ and Z″ is utilized for tracking the incident angle $\alpha$. The incident electromagnetic wave with a pointing vector P perpendicular to the antenna plane and at angle of linear polarization $\alpha$ is received by two crossed dipoles X and Y of antenna 15. The corresponding high frequency output voltages of these polarization sensing antennas may be designated as $E_x$ and $E_y$. These respective voltages are fed through two amplifiers (not shown) to two corresponding modulators 17 and 19 designated as the X and Y multipliers respectively. The X multiplier 17 forms a product of $E_x$ with a magnitude of cosine $\beta$ and the Y multiplier 19 forms a product of $E_y$ with a magnitude of sine $\beta$, where $\beta$ represents the system phase angle or the adjusted polarization pattern angle of the system. The output products of the two multipliers are summed in a summing device 21 to form a sum voltage $E_c$. The cosine $\beta$ and sine $\beta$ values are supplied from a sine cosine function generator 32, the operation of which is fully described in the afore-mentioned Vogt patent. The magnitude of cosine $\beta$ and sine $\beta$ are, in the simplest case, plus or minus direct voltages. The sum voltage $E_c$ from summing amplifier 21 is amplified and the RF frequency is converted to the IF frequency in the usual manner at the output of receiver 23. For a manual circuit process, the DC input voltage $V_c$ has to be varied in order to maximize the IF output. When the maximum is reached, angle $\beta$ is equal to angle $\alpha$. For slowly varying polarization angles continuous readjustment of $V_c$ is necessary. The output of receiver 23 is demodulated in demodulator 25 to provide a signal which serves as one input to the servo follow-up system. The control voltage $V_c$ is superimposed in summing device 34 with the scanning voltage frequency $f=27$ cycles per second derived from a scan oscillator 27 to control the phase shift of the function generator 32. This scanning signal from oscillator 27 is also applied through scan frequency doubler 29 as a reference against the demodulated signal, which is also a second order component, in a phase comparator 31 to provide an error signal $\pm e$ which may be applied to the mechanical servo 33 to maintain $V_c$ so that angle $\beta$ equals angle $\alpha$. In closed loop operation, the entire system has a tendency to keep $\beta$ equal to $\alpha$ so that the control system may follow any polarization change of the received signal. When $\beta$ differs from $\alpha$ the positive or negative error voltage may be generated and derived from phase comparator 31. This error voltage controls the direction and speed of servo system 33 by means of a motor M which drives a potentiometer POT through a reduction gear G, thus providing the control voltage $V_c$ which is applied to the summing device 34. The servo output voltage $V_c$ can also be recorded and automatic tracking and recording may be achieved. The present invention replaces the mechanical servo system 33 with an electronic servo system.

Referring now to FIG. 2, there is shown a system wherein the electronic servo system is utilized in place of the mechanical servo system shown in FIG. 1. Like elements are designated by like reference numbers. The output signal derived from demodulator 25 is compared with a reference signal derived from scan oscillator 27 in phase comparator 31, from which is derived the error voltage signal $\pm e$. This error voltage signal is applied as a modulating signal through amplifier 35 to a variable crystal controlled oscillator 37, the output $F_1$ of which is applied to a 100 to 1 frequency dividing circuit 39 which is adapted to produce a digital signal $1/100$ of $F_1$. A standard crystal controlled oscillator 41 is provided to generate a frequency output $F_2$ equal to that derived from variable frequency oscillator 37 when the signal error derived from phase comparator 31 is zero. Thus $F_1=F_2$ when the error signal voltage from phase comparator 31 is zero and for practical purposes, $F_1$ and $F_2$ are set to provide a frequency of 1 mc. at zero error voltage. As shown, the frequency output $F_2$ of standard oscillator 41 is applied to frequency divider circuit 43 adapted to provide a frequency division of 50 to 1. The output frequencies of the oscillators 37 and 41, i.e. $F_1$ and $F_2$, replace the motor function of the servo motor shown in FIG. 1 and the difference frequency determines the rotational speed of the electronic motor. The speed of course may be controlled by biasing a variable capacitance or voltage controlled diode (not shown) that changes the respective frequencies of oscillators 37 and 41.

The output frequency $F_2$ of divider 43 is passed through a squarer or flip-flop circuit 45 which provides two digital inverted outputs at 20 kc., assuming the above-noted 1 mc. frequency. The two digital inverted outputs at 20 kc. are each applied to a respective conventional 2:1 divider circuit to provide two signals at 10 kc. but differing in phase by 90° as represented by blocks 47 and 49. As shown, the 10 kc. 90°-phase output, block 47, is applied through amplifier 51 and filter 53 as one input to a gating circuit 55, the output of which is applied to a box-car generator circuit 57. Similarly, the 10 kc. 0°-phase output, block 45, is applied through amplifier 59 and filter 61 as one input to a gating circuit 63, the output of which is applied to a box-car generator circuit 65. The purpose of the filters 53 and 61 is to convert the respective 10 kc. digital signals to sine wave signals which differ in phase by 90° and thus provide sine and cosine functions, i.e., sin $\beta$ and cos $\beta$. In a similar manner, the digital output of 100:1 frequency divider 39, at 10 kc., is applied as a second input to gating circuits 55 and 63 through switches 62 and 64 and trigger pulse circuit 67 which provides triggering pulses at 10 kc. The gating circuits 55 and 63 are simultaneously activated at a predetermined time $T_c$ by the output of pulse shaper 67. The time $T_c$ of the gating pulse is determined by the relative position of the output pulses derived from divider 39 as referenced below. The respective outputs of gate circuits 55 and 63 are filtered by the respective box-car circuits 57 and 65 to provide DC voltages whose respective magnitudes are proportional to the instantaneous amplitudes of sin $\beta$ and cos $\beta$ at time $T_c$. These relative magnitudes are compared with the incident polarization angle $\alpha$ to determine the error between the polarization vector received and the adjusted phase angle $\beta$ of the system.

Up to this point the arrangement described above is for a static or passive condition at zero error voltage. In order to close the servo loop and thus actuate the control system, the switches 62 and 64 are switched to position 2 so that a pulse position modulator 71 is connected between the output of divider 39 and trigger circuit 67. The pulse position modulator 71 is identical to that described and shown in FIG. 2 of U.S. Patent No. 3,238,527 noted above. The output of scan oscillator 27 is also applied through an amplitude control circuit 73 to the pulse position modulator 71 as the pulse positioning frequency which in turn determines time $T_c$ as described in the afore-mentioned Vogt patent. The pulse position modulator 71 will thus provide pulses at approximately 10 kc., the exact value being a function of the error signal. This approximate 10 kc. signal will be varied from a given center or zero error position by the scan frequency derived from oscillator 27. The demodulator 25 output active conditions then can be compared in phase comparator 31 with the output of scan oscillator 27 to provide an error signal which will be reduced to zero error signal position by means of the electronic servo system.

In describing the operation of the system, it is assumed that the error voltage is initially zero and that $F_1$ is equal to $F_2$ at a frequency of 1 mc. Assuming an error voltage of +1 volt, the $F_1$ frequency will be 100 c./s. higher than $F_2$ and the equivalent electronic motor speed may be said to be 100 c./s. If the error voltage varies $\pm 1$ volt, the difference frequency changes from −100 c./s. to +100 c./s. with a change of the sense of rotation at zero error voltage. Up to this point, the equivalent electronic motor has only the time domain available while mechanical rotation occurs in the space domain. In order to stimulate the rotation in space, the two channels in the time domain are phase shifted in 90° or are in quadrature. This is accomplished through the digital phase shifting circuit comprising blocks 45, 47 and 49. This requires an arrangement of the "electronic gear" of the quadrature circuit (rotation generator) in contrast to the mechanical arrangement shown in FIG. 1 where the gear drive follows the motor. In addition, the electronic gear or, in correct technical terms, the frequency divider has to be provided twice, once in each channel. Thus in FIG. 2, the two oscillators 37 and 41 are followed by respective frequency dividers. Assuming that for the purpose of maintaining a required loop gain, the mechanical gear ratio was 100:1, the frequency divider will therefore be at 100:1 as shown by block 39. The two box-car circuits 57 and 65 generate the rotational output functions $A \cos \beta t$ and $A \sin \beta t$ thus simulating a rotational frequency as in our example of 1 c./s.

What is claimed is:

1. In combination with a polarization follower system having a pair of quadrature positioned crossed dipole antennas and means for producing signal components of the angle of polarization of an incident wave of high frequency energy, said polarization angle being substantially equal to the system phase angle and further including means for adding said signal components to provide a sum signal, and a receiver for demodulating said sum signal, an electronic servo system for maintaining the system phase angle in synchronization with the incident polarization angle of a target comprising a source of reference frequency signals, means for comparing the phase of the demodulated output signal of said receiver with said reference frequency signal for producing an error signal when there is a phase displacement therebetween, a standard frequency signal source, means for deriving from said standard frequency signal two sine wave signals having the same frequency but differing in phase by 90°, said same frequency being a prescribed submultiple of said standard frequency signal, a variable frequency signal source responsive to said error signal and adapted to produce an output frequency equal to said standard frequency signal at zero error signal, means for deriving from said variable frequency signal a submultiple thereof substantially equal to said prescribed submultiple frequency, the difference between said prescribed submultiple frequency from said standard source and the submultiple frequency from said variable source being a function of the magnitude of said error signal, means responsive to the submultiple frequency output of said variable frequency source and modulated by said reference frequency signal to produce cyclic pulses, respective gating means responsive to said sine wave signals and activated by said cyclic pulses whereby only a prescribed instantaneous magnitude of said respective sine wave signals pass through said gating means, and means including said signal components producing means and responsive to the output of said gating means for reducing the phase displacement between the receiver demodulated signal and said reference signal to reduce the error between the system phase angle and the incident polarization angle.

2. The system in accordance with claim 1 wherein said last mentioned means comprises respective box-car circuits responsive to the respective outputs of said gating means.

3. The system in accordance with claim 1 wherein said sine wave submultiple frequency producing means comprises a 50 to 1 divider circuit, means for squaring the output of said divider circuit, and a 2 to 1 divider circuit responsive to the squarer output.

4. The system in accordance with claim 3 wherein the frequency of both said standard signal and said variable signal is 1 mc. for zero error voltage signal.

5. The system in accordance with claim 4 wherein the variable oscillator submultiple frequency producing means comprises a 100 to 1 divider circuit.

6. The system in accordance with claim 5 wherein the variable oscillator submultiple frequency signal comprises a digital signal.

7. The system in accordance with claim 6 wherein said last mentioned means comprises respective box-car circuits responsive to the respective outputs of said gating means.

References Cited

UNITED STATES PATENTS

| | | | |
|---|---|---|---|
| 3,238,527 | 3/1966 | Vogt | 343—100 |
| 3,369,234 | 2/1968 | Bush et al. | 343—100 |

RODNEY D. BENNETT, Jr., *Primary Examiner.*

T. H. TUBBESING, *Assistant Examiner.*

U.S. Cl. X.R.

331—1